(12) United States Patent  
Yuki et al.

(10) Patent No.: US 11,964,625 B2
(45) Date of Patent: Apr. 23, 2024

(54) SIDE AIRBAG AND SIDE AIRBAG DEVICE

(71) Applicant: JOYSON SAFETY SYSTEMS JAPAN K.K., Tokyo (JP)

(72) Inventors: Tatsuya Yuki, Shiga (JP); Masatoshi Yokota, Shiga (JP)

(73) Assignee: Joyson Safety Systems Japan G.K. (JP)

( * ) Notice: Subject to any disclaimer, the term of this patent is extended or adjusted under 35 U.S.C. 154(b) by 122 days.

(21) Appl. No.: 17/770,120

(22) PCT Filed: Oct. 5, 2020

(86) PCT No.: PCT/JP2020/037701
§ 371 (c)(1),
(2) Date: Apr. 19, 2022

(87) PCT Pub. No.: WO2021/090622
PCT Pub. Date: May 14, 2021

(65) Prior Publication Data
US 2022/0363215 A1    Nov. 17, 2022

(30) Foreign Application Priority Data

Nov. 5, 2019 (JP) ................. 2019-200809

(51) Int. Cl.
*B60R 21/231* (2011.01)
*B60R 21/233* (2006.01)

(52) U.S. Cl.
CPC ...... *B60R 21/23138* (2013.01); *B60R 21/233* (2013.01); *B60R 2021/23146* (2013.01)

(58) Field of Classification Search
CPC .......... B60R 2021/2332; B60R 21/233; B60R 21/23138; B60R 2021/23146;
(Continued)

(56) References Cited

U.S. PATENT DOCUMENTS 8,757,657 B1     6/2014 Hotta et al.
2011/0285119 A1* 11/2011 Yamamoto .......... B60R 21/2346
                                              112/475.08
(Continued)

FOREIGN PATENT DOCUMENTS

EP     3 219 557 A1    9/2017
JP     10273010 A  * 10/1998
(Continued)

OTHER PUBLICATIONS

International Searching Authority, "International Search Report," issued in connection with International Patent Application No. PCT/JP2020/037701, dated Nov. 10, 2020.
(Continued)

*Primary Examiner* — Karen Beck
(74) *Attorney, Agent, or Firm* — Foley & Lardner LLP

(57)     ABSTRACT

A side airbag that is to be inflated and deployed to a side of an occupant, includes: an upper chamber provided at an upper portion; a lower chamber provided at a lower portion; a middle chamber between the upper chamber and the lower chamber; a first partition panel that partitions the upper chamber from the middle chamber; a second partition panel that partitions the lower chamber from the middle chamber; a third partition panel that partitions the middle chamber from an inflator installation chamber; a first opening that is provided in the first partition panel and through which the upper and middle chambers communicate with each other; and a second opening that is provided in the second partition panel and through which the lower and middle chambers communicate with each other, and each of the first and second partition panels is joined to the third partition panel.

18 Claims, 12 Drawing Sheets

(58) Field of Classification Search
CPC ........ B60R 21/207; B60R 2021/23316; B60R 2021/23576; B60R 2021/23538
See application file for complete search history.

(56) References Cited

U.S. PATENT DOCUMENTS

| | | |
|---|---|---|
| 2012/0043741 A1 | 2/2012 | Yamamoto |
| 2012/0056410 A1 | 3/2012 | Yamamoto |
| 2012/0248746 A1 | 10/2012 | Yamamoto |
| 2013/0033022 A1* | 2/2013 | Yamamoto ............ B60R 21/231 280/730.2 |
| 2014/0167395 A1 | 6/2014 | Yamamoto |
| 2015/0367806 A1* | 12/2015 | Fujiwara ............... B60R 21/233 280/729 |
| 2015/0367811 A1* | 12/2015 | Kobayashi ............ B60R 21/233 280/730.2 |
| 2016/0075303 A1 | 3/2016 | Iida et al. |
| 2016/0101757 A1 | 4/2016 | Fujiwara |
| 2016/0114757 A1 | 4/2016 | Fujiwara |
| 2016/0159310 A1 | 6/2016 | Kobayashi et al. |
| 2016/0159313 A1 | 6/2016 | Fujiwara |
| 2016/0200280 A1 | 7/2016 | Fujiwara |
| 2016/0368449 A1 | 12/2016 | Fujiwara |
| 2017/0182962 A1 | 6/2017 | Hiraiwa et al. |
| 2021/0323496 A1 | 10/2021 | Kobayashi et al. |

FOREIGN PATENT DOCUMENTS

| | | |
|---|---|---|
| JP | H10-273010 A | 10/1998 |
| JP | 2010-184595 A | 8/2010 |
| JP | 2011-140269 A | 7/2011 |
| JP | 2011-162012 A | 8/2011 |
| JP | 2011-194935 A | 10/2011 |
| JP | WO-2010-131326 A1 | 11/2012 |
| JP | WO-2011-132316 A1 | 7/2013 |
| JP | 2014-141159 A | 8/2014 |
| JP | 2014-159265 A | 9/2014 |
| JP | 2015-013500 A | 1/2015 |
| JP | 2015-030322 A | 2/2015 |
| JP | 5804214 B2 | 11/2015 |
| JP | 2016-060481 A | 4/2016 |
| JP | 2016-078464 A | 5/2016 |
| JP | 2016-084048 A | 5/2016 |
| JP | 2016-094079 A | 5/2016 |
| JP | 2017-119497 A | 7/2017 |
| JP | 2018-161925 A | 10/2018 |
| JP | WO-2018-047617 A1 | 6/2019 |
| JP | 2019-116276 A | 7/2019 |
| WO | WO-2011/077510 A1 | 6/2011 |
| WO | WO-2015/020052 A1 | 2/2015 |

OTHER PUBLICATIONS

International Searching Authority, "Written Opinion," issued in connection with International Patent Application No. PCT/JP2020/037701, dated Nov. 10, 2020.

* cited by examiner

SIDE AIRBAG AND SIDE AIRBAG DEVICE

CROSS-REFERENCE TO RELATED APPLICATIONS

The present application claims priority under 37 U.S.C. § 371 to International Patent Application No. PCT/JP2020/037701, filed Oct. 5, 2020, which claims priority to and the benefit of Japanese Patent Application No. 2019-200809, filed on Nov. 5, 2019. The contents of these applications are hereby incorporated by reference in their entireties.

TECHNICAL FIELD

The present invention relates to a side airbag and a side airbag device that are to be inflated and deployed to a side of a vehicle occupant.

BACKGROUND ART

As a side airbag that is to be inflated and deployed to a side of an occupant at the time of a side collision or the like of a vehicle such as an automobile, Patent Document 1 discloses a side airbag device that is to be inflated and deployed to cover an occupant from a shoulder part to a waist part thereof. An inside of the side airbag of Patent Document 1 is partitioned into a plurality of chambers by a partition portion. An upper chamber of the side airbag restrains the shoulder part of the occupant, and a lower chamber restrains the waist part of the occupant. In addition, a chamber on a front side of a middle portion in an up-down direction restrains a chest part and a belly part.

PRIOR ART DOCUMENT

Patent Document

Patent Document 1: JP-A-2014-141159

SUMMARY OF INVENTION

Problem to be Solved by the Invention

In the side airbag disclosed in Patent Document 1, a partition portion extending in the up-down direction is provided in the middle portion in the up-down direction, and a front side of the partition portion is a front-side chamber that restrains the chest part and the belly part. A cylindrical flow regulating cloth extending in the up-down direction is provided at a rear portion of the middle portion in the up-down direction. A portion between the flow regulating cloth and the front-side chamber is a central chamber that inflates separately from the front-side chamber.

A gas flows into the central chamber via the upper chamber of the side airbag. Therefore, the inflation and deployment of the upper chamber is delayed by an amount of time in which the gas flows to the central chamber.

An object of the present invention is to provide a side airbag capable of speeding up inflation and deployment of an upper chamber that restrains a shoulder part of an occupant and a lower chamber that restrains a waist part of the occupant, and capable of increasing an internal pressure, and a side airbag device including the side airbag.

Means for Solving the Problem

A side airbag according to the present invention is a side airbag that is to be inflated and deployed to a side of an occupant, includes an upper chamber provided at an upper portion, a lower chamber provided at a lower portion, and a middle chamber between the upper chamber and the lower chamber, and has a structure by which inflation of the upper chamber and the lower chamber is accelerated and is performed under a high internal pressure.

In one aspect of the present invention, the side airbag includes: the middle chamber between the upper chamber and the lower chamber; a first partition panel that partitions the upper chamber from the middle chamber; a second partition panel that partitions the lower chamber from the middle chamber; a third partition panel that partitions the middle chamber from an inflator installation chamber; a first opening that is provided in the first partition panel and through which the upper chamber and the middle chamber communicate with each other; and a second opening that is provided in the second partition panel and through which the lower chamber and the middle chamber communicate with each other. In the side airbag, the first partition panel is joined to the third partition panel, and the second partition panel is joined to the third partition panel.

In one aspect of the present invention, the first partition panel extends upward toward a front side.

In one aspect of the present invention, the second partition panel extends downward toward the front side.

In one aspect of the present invention, the first partition panel extends from a front edge to a rear edge of the side airbag, and a rear portion of the first partition panel is sewn to an upper edge of the third partition panel.

In one aspect of the present invention, the second partition panel extends from a front edge to a rear edge of the side airbag, and a rear portion of the second partition panel is sewn to a lower edge of the third partition panel.

In one aspect of the present invention, there is provided the inflator installation chamber that is positioned on a rear side in the middle chamber and communicates with the upper chamber and the lower chamber, respectively.

In one aspect of the present invention, an outer surface of the side airbag is constituted by a main panel, and the main panel includes a right main panel positioned on a right side surface of the side airbag and a left main panel positioned on a left side surface of the side airbag.

In one aspect of the present invention, a protruding portion protruding rearward is provided at a middle portion of rear edges of the right main panel and the left main panel in an up-down direction, a portion between the protruding portion of the right main panel and the protruding portion of the left main panel serves as a loading/unloading opening for an inflator, and the protruding portions or a vicinity of the protruding portions is folded back to a front side to close the loading/unloading opening.

In one aspect of the present invention, the right main panel and the left main panel are formed of a single continuous main panel in which the right main panel and the left main panel are connected to each other at front portions thereof, the main panel is folded back along a center line between the right main panel and the left main panel, and the right main panel and the left main panel are sewn together at an outer peripheral edge of the main panel between the folding line and the loading/unloading opening.

In one aspect of the present invention, the first partition panel includes a right first partition panel extending along a right side surface of the side airbag and a left first partition panel extending along a left side surface of the side airbag, a lower edge of the right first partition panel is sewn to the right main panel, and a lower edge of the left first partition panel is sewn to the left main panel.

In one aspect of the present invention, an upper edge of a rear portion of the right first partition panel is sewn to a right portion of an upper edge of the third partition panel, an upper edge of a rear portion of the left first partition panel is sewn to a left portion of an upper edge of the third partition panel, and a front portion of an upper edge of the right first partition panel and a front portion of an upper edge of the left first partition panel are sewn together.

In one aspect of the present invention, the right first partition panel and the left first partition panel are formed of a single panel in which the right first partition panel and the left first partition panel are connected to each other at front portions thereof.

In one aspect of the present invention, the second partition panel includes a right second partition panel extending along the right side surface of the side airbag and a left second partition panel extending along the left side surface of the side airbag, an upper edge of the right second partition panel is sewn to the right main panel, and an upper edge of the left second partition panel is sewn to the left main panel.

In one aspect of the present invention, a lower edge of a rear portion of the right second partition panel is sewn to a right portion of a lower edge of the third partition panel, a lower edge of a rear portion of the left second partition panel is sewn to a left portion of a lower edge of the third partition panel, and a front portion of a lower edge of the right second partition panel and a front portion of a lower edge of the left second partition panel are sewn together.

In one aspect of the present invention, the right second partition panel and the left second partition panel are formed of a single panel in which the right second partition panel and the left second partition panel are connected to each other at front portions thereof.

In one aspect of the present invention, the third partition panel includes a right third partition panel and a left third partition panel, a front edge of the right third partition panel and a front edge of the left third partition panel are sewn together, an upper edge of the right third partition panel and an upper edge of the left third partition panel are not sewn together, whereby the inflator installation chamber is open toward the upper chamber, and a lower edge of the right third partition panel and a lower edge of the left third partition panel are not sewn together, whereby the inflator installation chamber is open toward the lower chamber.

In one aspect of the present invention, the third partition panel is provided with an opening through which the inflator installation chamber and the middle chamber communicate with each other.

In one aspect of the present invention, a vent hole is provided in a front portion of the middle chamber.

A side airbag of the present invention includes the airbag of the present invention and an inflator that inflates the airbag.

Effects of the Invention

The side airbag of the present invention includes three chambers, that is, an upper chamber, a middle chamber, and a lower chamber. With the side airbag, inflation and deployment, of an upper chamber that restrains a shoulder part of an occupant and a lower chamber that restrains a waist part of the occupant, can be accelerated and can be performed under a high internal pressure.

In one aspect of the present invention, the inflator installation chamber is provided at a rear portion of the middle chamber, and there is no chamber between the inflator installation chamber and the middle chamber. Therefore, the upper chamber and the lower chamber are inflated and deployed at an early stage without using a large-capacity inflator that generates a large amount of gas.

EMBODIMENTS FOR CARRYING OUT THE INVENTION

Figure 1:
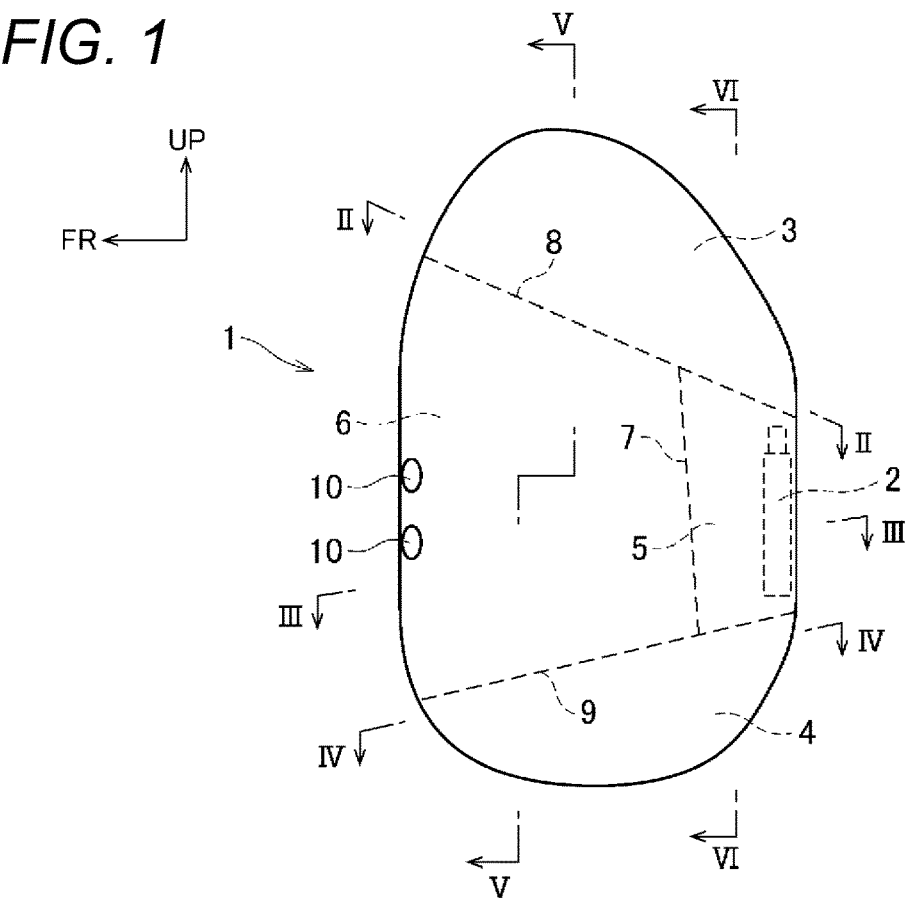
FIG. 1 is a side view of a side airbag according to an embodiment as viewed from an occupant side.
Figure 2:
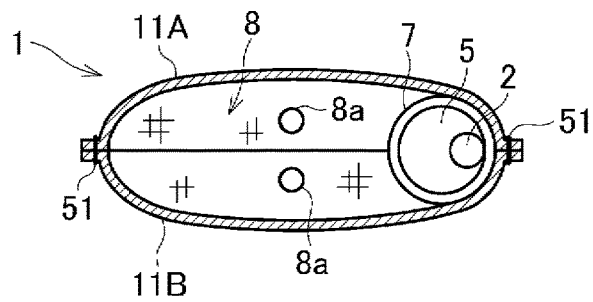
FIG. 2 is a cross-sectional view taken along a line II-II in FIG. 1.
Figure 3:
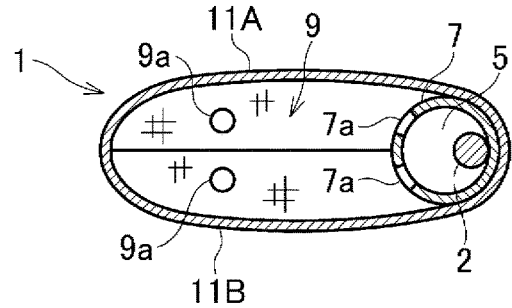
FIG. 3 is a schematic cross-sectional view taken along a line in FIG. 1.
Figure 4:
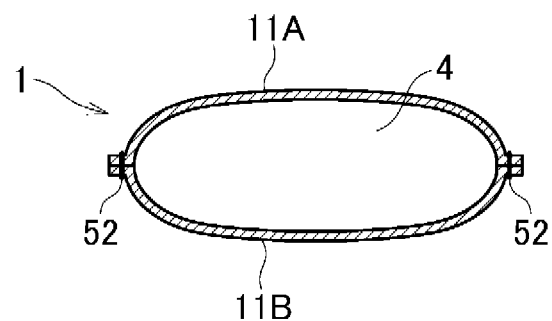
FIG. 4 is a schematic cross-sectional view taken along a line IV-IV in FIG. 1.
Figure 5:
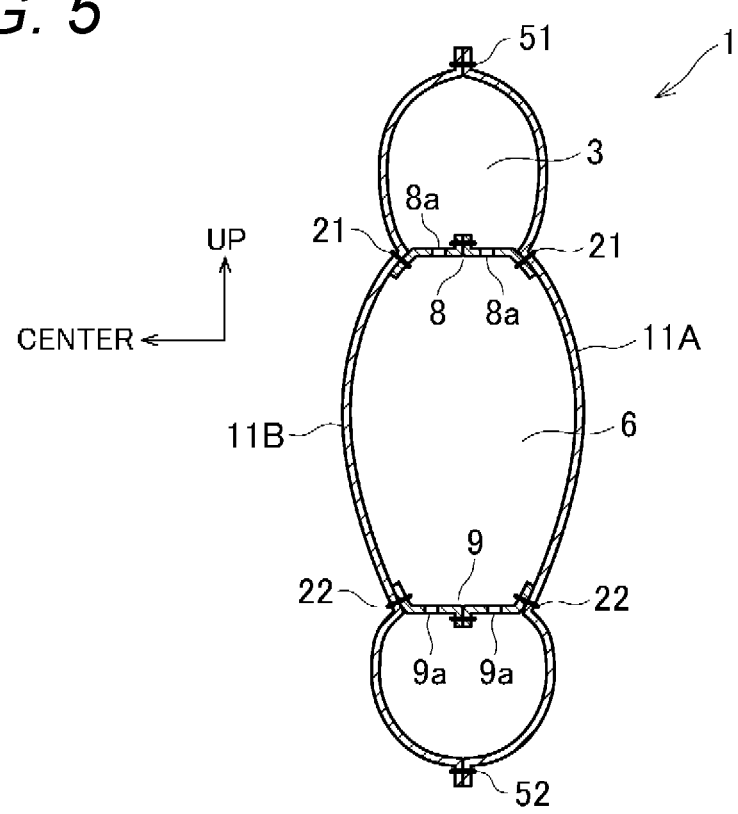
FIG. 5 is a schematic cross-sectional view taken along a line V-V in FIG. 1.
Figure 6:
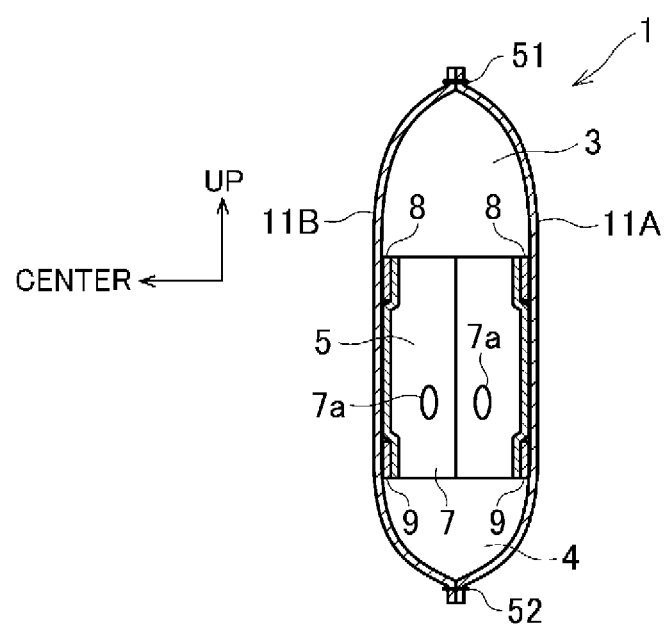
FIG. 6 is a schematic cross-sectional view taken along a line VI-VI in FIG. 1.

Hereinafter, an embodiment of the present invention will be described with reference to the drawings. In the following embodiment, front-rear, up-down, and left-right directions coincide with front-rear, up-down, and left-right directions of a vehicle unless otherwise specified. FR, UP, and CENTER in the drawings respectively indicate a front direction, an upper direction, and a center side in a vehicle width direction of the vehicle.

FIGS. 1 to 6 schematically illustrate an inflated state of a side airbag 1 according to an embodiment of the present invention, and FIGS. 7 to 16 are views for illustrating a method of manufacturing the side airbag.

A side airbag device according to the present embodiment is to be mounted on a vehicle body side surface member side of a vehicle seat such as a door. In the present embodiment, the seat is a right side seat of an automobile, and the airbag device is mounted on a right side portion of the seat.

The seat includes a seat cushion, a seatback, and a headrest. The seatback includes a seatback frame serving as a framework of the seatback.

In the present embodiment, the airbag device is attached to the seatback frame.

The airbag device includes the side airbag 1 that is folded and housed in the seatback, and an inflator 2 that supplies an inflation gas to the side airbag 1.

An inside of the side airbag 1 is divided into an upper chamber 3, a lower chamber 4, and a middle chamber 6 between the upper chamber 3 and the lower chamber 4 by partition panels 7, 8, and 9. An inflator installation chamber 5 is provided in a rear portion of the middle chamber 6.

The upper chamber 3 is to be inflated and deployed to a side of a shoulder part of an occupant, and the lower chamber 4 is to be inflated and deployed to a side of a waist part of the occupant. The middle chamber 6 is to be inflated and deployed to sides of a chest part and a belly part of the occupant.

The upper chamber 3 and the middle chamber 6 are separated from each other by the first partition panel 8. The first partition panel 8 is provided with an opening 8a through which the upper chamber 3 and the middle chamber 6 communicate with each other.

The lower chamber 4 and the middle chamber 6 are separated from each other by the second partition panel 9. The second partition panel 9 is provided with an opening 9a through which the lower chamber 4 and the middle chamber 6 communicate with each other.

The inflator installation chamber 5 is surrounded by the third partition panel 7. The partition panel 7 is a cylindrical gas distribution diffuser extending in the up-down direction, and has an upper end portion opened toward the upper chamber 3 and a lower end portion opened toward the lower chamber 4. An opening 7a is provided in a front portion of the third partition panel 7. The inflator installation chamber 5 and the middle chamber 6 communicate with each other through the opening 7a.

The inflator 2 is installed in the inflator installation chamber 5. In this embodiment, the inflator 2 has a cylindrical shape, and is installed with a longitudinal direction thereof coinciding with the up-down direction.

A vent hole 10 through which the gas flows out from the middle chamber 6 is provided in a front portion of the side airbag 1.

A configuration of a panel constituting the side airbag 1 will be described with reference to FIGS. 7 to 16.

Figure 7:
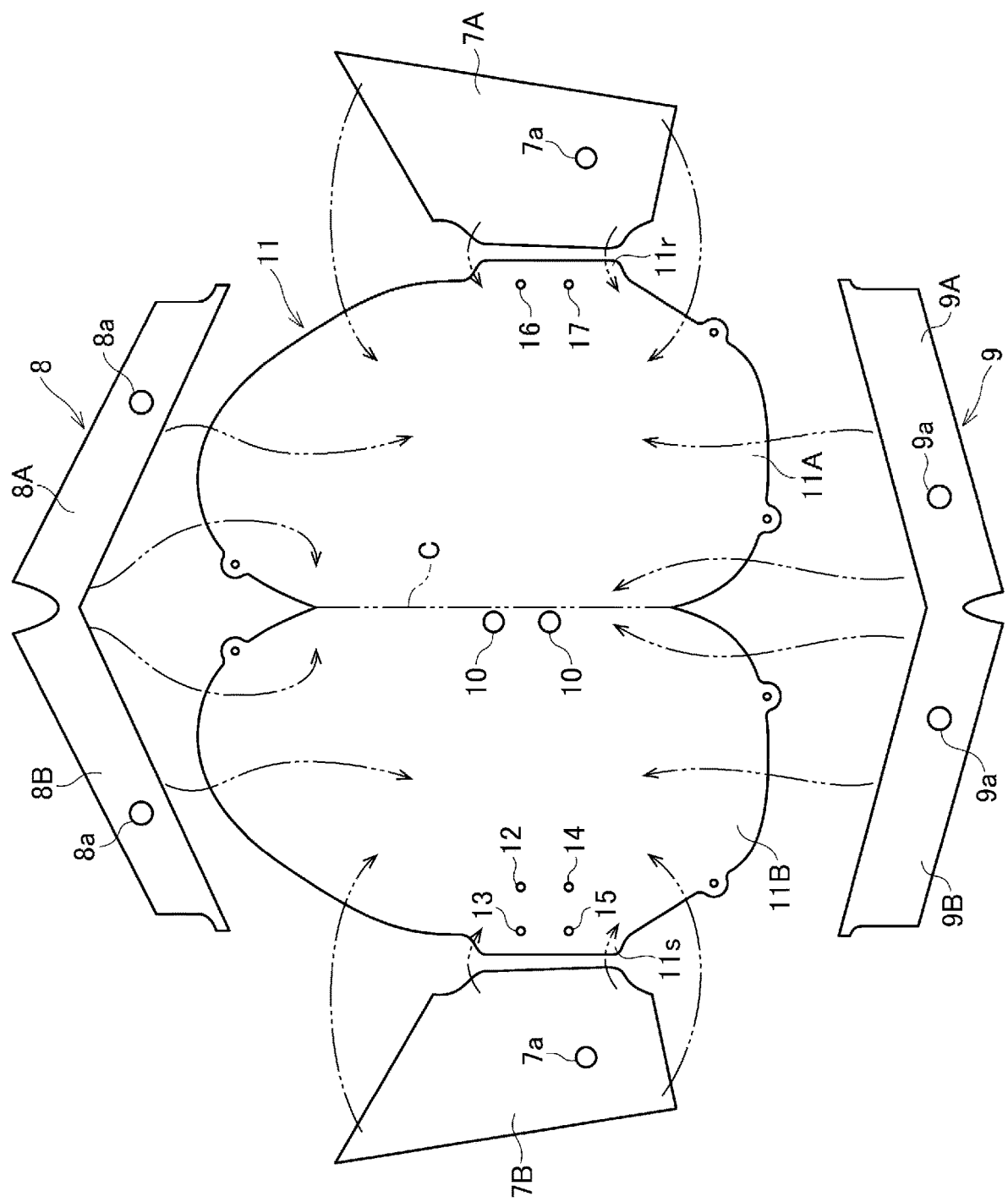
FIG. 7 is a panel configuration diagram of the side airbag.

An outer surface of the side airbag 1 is constituted by a main panel 11. As illustrated in FIG. 7, the main panel 11 includes a right main panel 11A constituting a right outer surface of the side airbag 1 and a left main panel 11B constituting a left outer surface of the side airbag 1. The right main panel 11A and the left main panel 11B are integrated in series, and the main panel 11 has a symmetrical shape with respect to a center line C. The vent hole 10 is provided in the vicinity of the center line C in the left main panel 11B.

Protruding portions 11r and 11s that protrude rearward of the side airbag 1 are provided at middle portions of a right edge and a left edge (rear edges of the side airbag 1) of the right main panel 11A and the left main panel 11B in the up-down direction.

Four small holes 12 to 15 for bolt insertion are provided at the left edge of the left main panel 11B. Two small holes 16 and 17 for bolt insertion are provided at the right edge of the right main panel 11A. The small holes 16 and 17 are disposed at positions symmetrical to the small holes 13 and 15 with respect to the center line C.

As illustrated in FIG. 7, the first and second partition panels 8 and 9 include right partition panels 8A and 9A and left partition panels 8B and 9B, respectively. The right first partition panel 8A and the left first partition panel 8B are integrated in series, and are connected to each other at front portions thereof. Each of the right partition panel 8A and the left partition panel 8B has a width that gradually decreases from the front portion toward a rear portion. The right second partition panel 9A and the left second partition panel 9B are integrated in series, and are connected to each other at front portions thereof.

The third partition panel 7 is formed by sewing a right third partition panel 7A and a left third partition panel 7B together.

Figure 8:
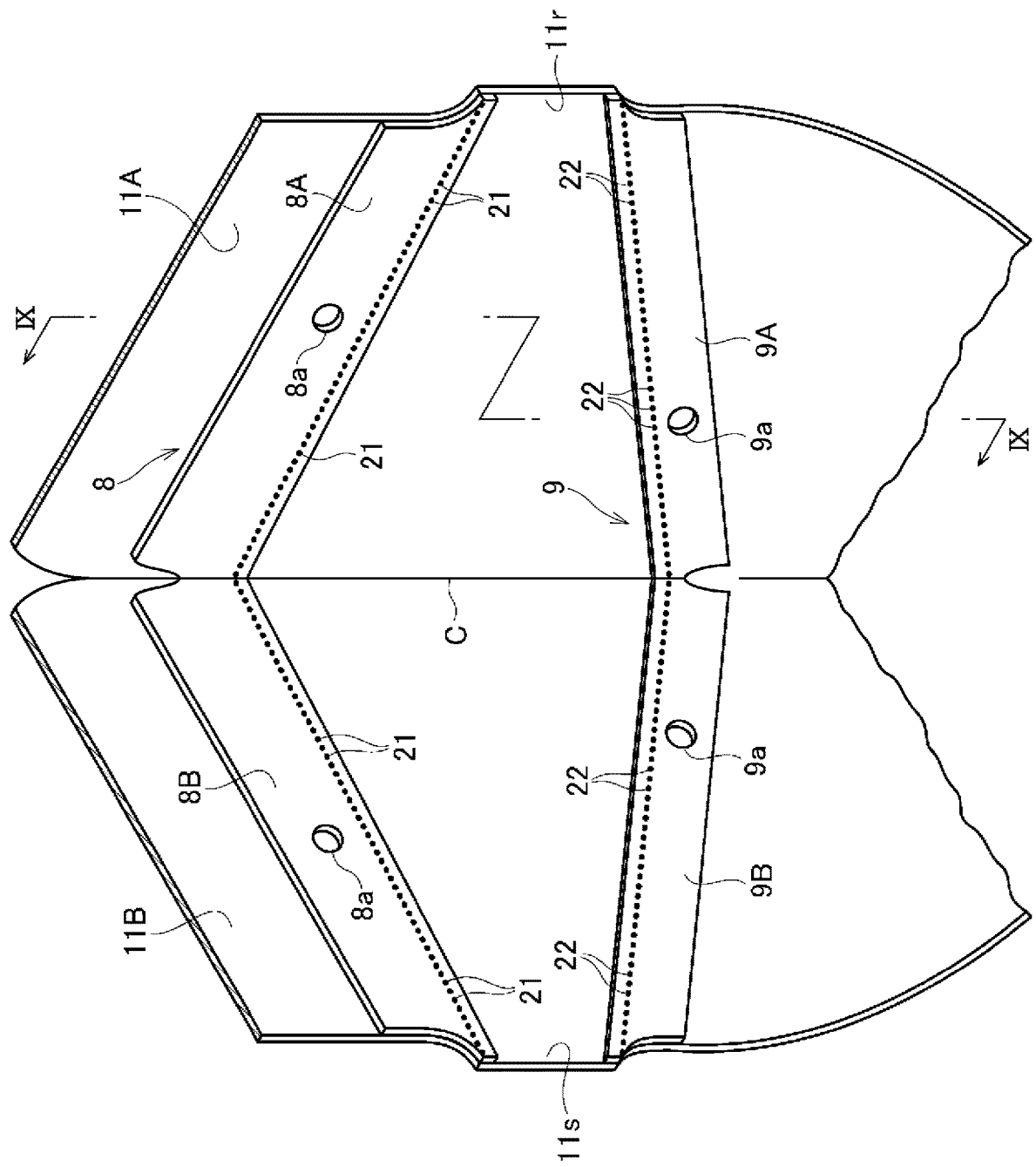
FIG. 8 is a perspective view illustrating a part of the side airbag in the course of sewing.
Figure 10:
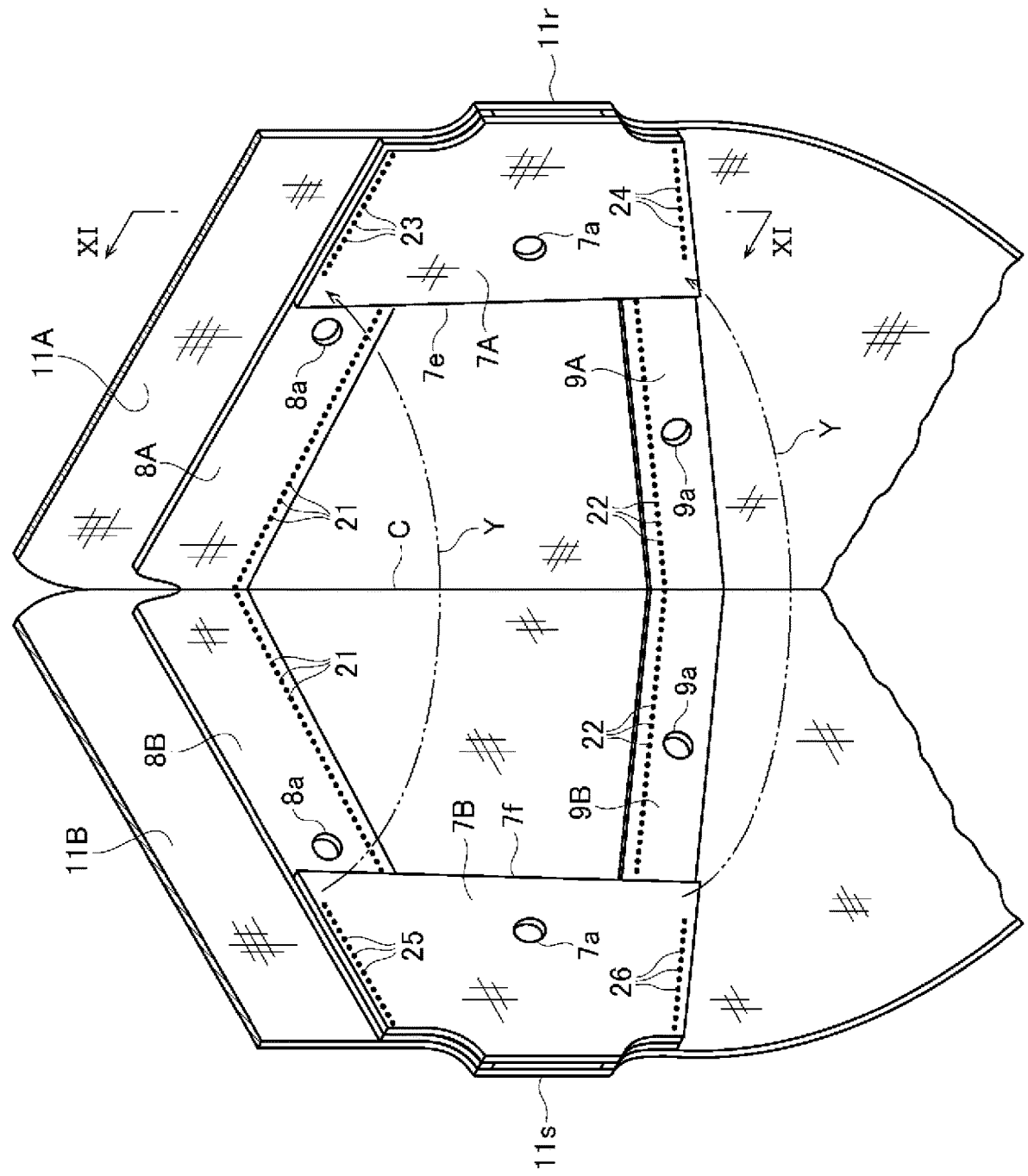
FIG. 10 is a perspective view illustrating a part of the side airbag in the course of sewing.

When sewing the side airbag 1, the partition panels 8 and 9 are disposed so as to overlap the main panel 11 in a manner of extending from a left end to a right end of the main panel 11, as illustrated in FIGS. 7 and 8. In FIGS. 8 and 10, the main panel 11 and the partition panels 8 and 9 are shown in a state of being bent at a right angle along the center line C.

Figure 9:
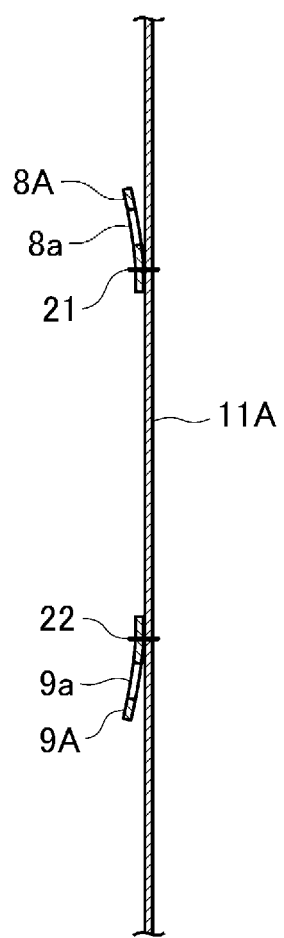
FIG. 9 is a cross-sectional view taken along a line IX-IX in FIG. 8.

As illustrated in FIGS. 8 and 9, a lower edge of the partition panel 8 is sewn to the main panel 11 by a sewing thread 21, and an upper edge of the partition panel 9 is sewn to the main panel 11 by a sewing thread 22.

Figure 11:
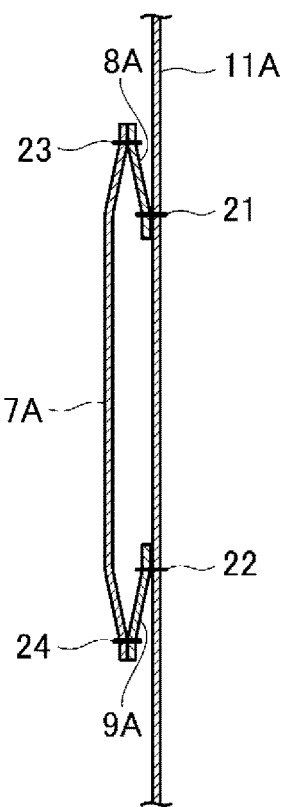
FIG. 11 is a cross-sectional view taken along a line XI-XI in FIG. 10.

After the partition panels 8 and 9 are sewn to the main panel 11, the partition panels 7A and 7B are arranged, and the partition panels 7A and 7B are sewn to the partition panels 8 and 9 by sewing threads 23 to 26, as illustrated in FIGS. 10 and 11. The partition panel 7A extends from an upper edge of the partition panel 8A to a lower edge of the partition panel 9A along the right edge of the main panel 11A. The partition panel 7B extends from an upper edge of the partition panel 8B to a lower edge of the partition panel 9B along the left edge of the main panel 11B.

Upper edges of the partition panels 7A and 7B are sewn to the upper edges of the partition panels 8A and 8B by the sewing threads 23 and 25. Lower edges of the partition panels 7A and 7B are sewn to the lower edges of the partition panels 9A and 9B by the sewing threads 24 and 26. As illustrated in FIG. 11, the sewing threads 23 to 26 sew only the partition panels 7A and 7B to the partition panels 8 and 9. The sewing threads 23 to 26 do not sew the partition panels 7A, 7B, 8, and 9 to the main panel 11.

After the partition panels 7A and 7B are sewn to the partition panels 8 and 9 as described above, the main panel 11 is folded back along the center line C as indicated by an arrow Y in FIG. 10. Thus, as illustrated in FIG. 12, the right and left partition panels 8A and 8B overlap each other, the right and left partition panels 9A and 9B overlap each other, and the right and left partition panels 7A and 7B overlap each other.

Figure 13:
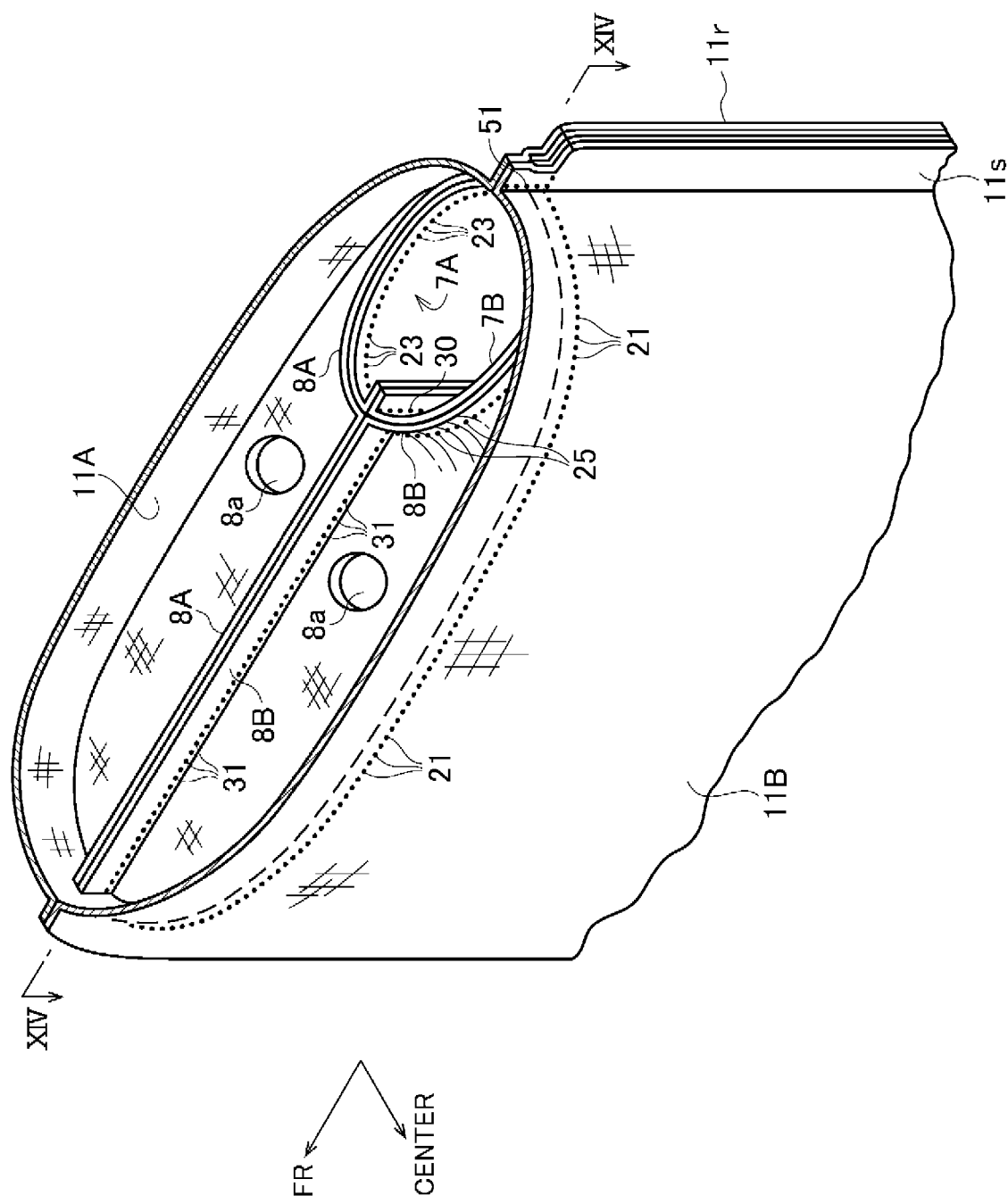
FIG. 13 is a cross-sectional perspective view of an inflated side airbag as taken along a line XIII-XIII in FIG. 12.
Figure 14:
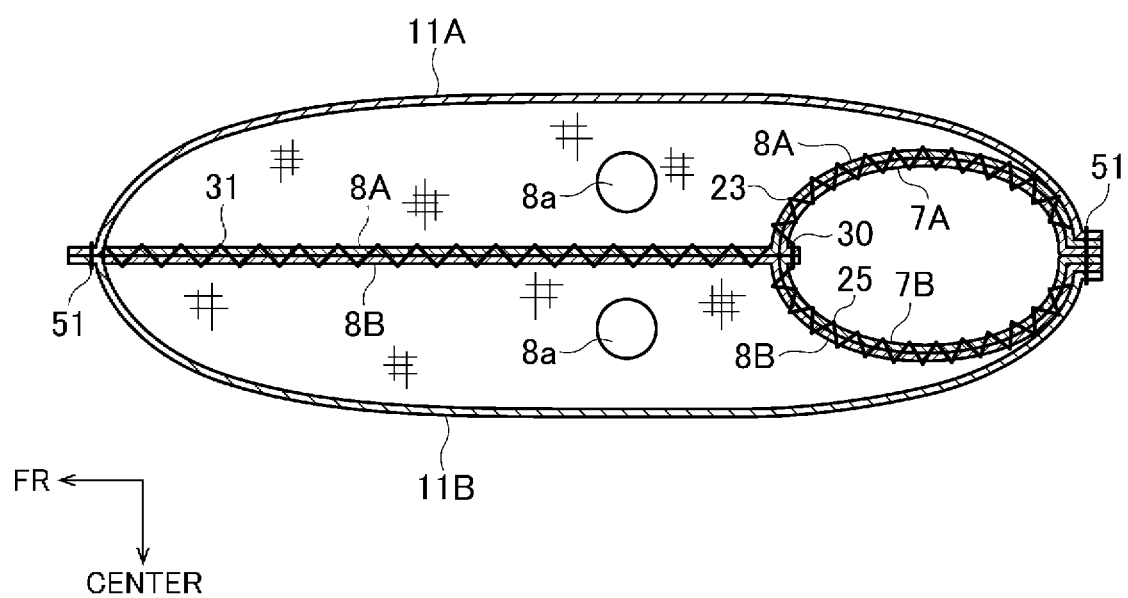
FIG. 14 is a cross-sectional view taken along a line XIV-XIV in FIG. 13.
Figure 15:
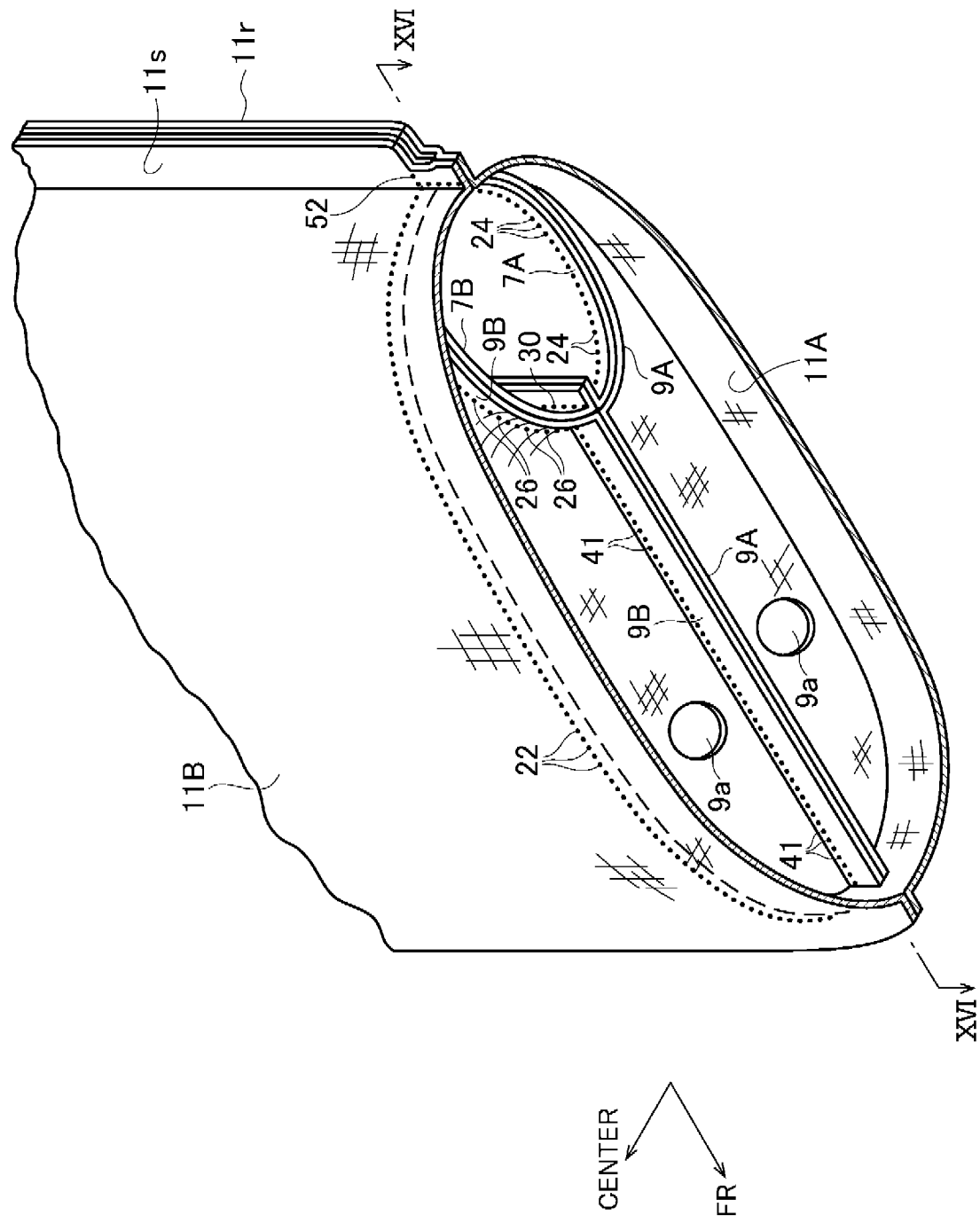
FIG. 15 is a cross-sectional view of the inflated side airbag taken along a line XV-XV in FIG. 12.
Figure 16:
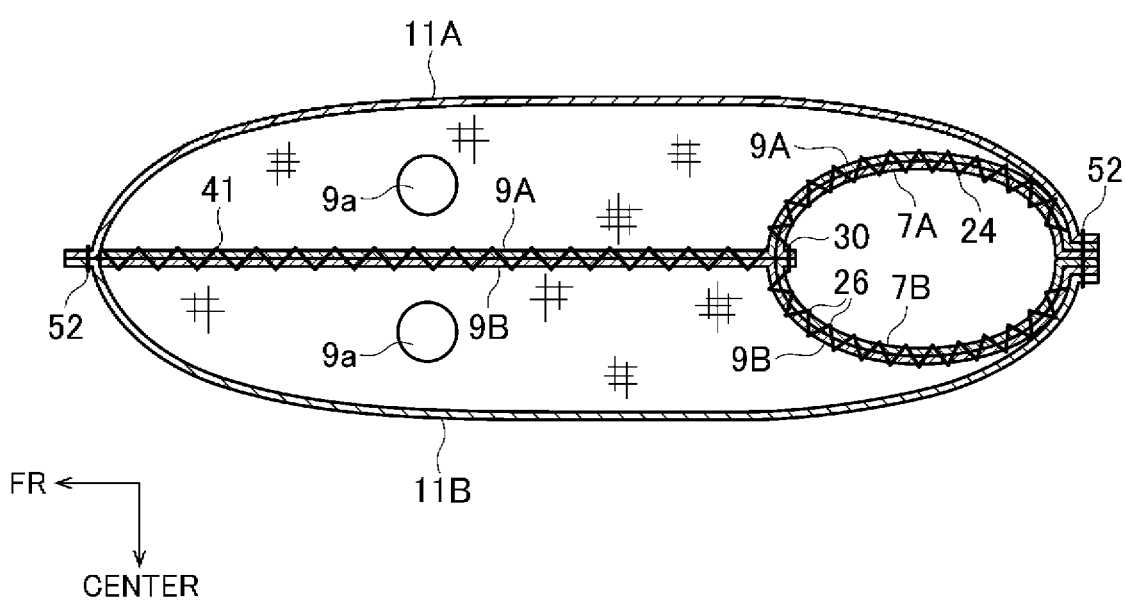
FIG. 16 is a cross-sectional perspective view taken along a line XVI-XVI in FIG. 14.

In this state, portions of the upper edges of the partition panels 8A and 8B on a front side of the partition panels 7A and 7B are sewn together by a sewing thread 31 (FIG. 13). In addition, portions of the lower edges of the partition panels 9A and 9B on a front side of the partition panels 7A and 7B are sewn together by a sewing thread 41 (FIG. 15). The sewing thread 31 is provided such that a rear end thereof extends to a position substantially overlapping front ends of the sewing threads 23 and 25, and the sewing thread 41 is provided such that a rear end thereof extend to a position substantially overlapping front ends of the sewing threads 24 and 26.

Further, front edges 7e and 7f (FIG. 10) of the partition panels 7A and 7B are sewn together by a sewing thread 30 (FIGS. 13 to 16).

Figure 12:
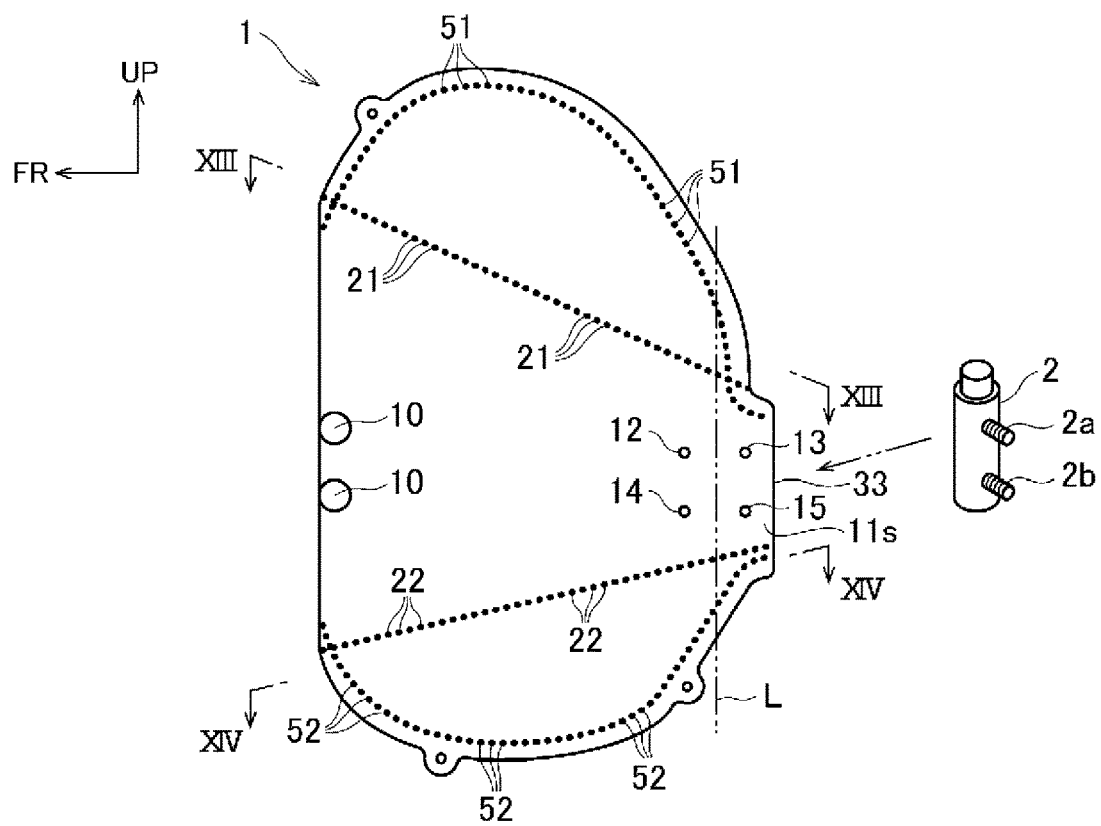
FIG. 12 is a side view of a sewn side airbag as viewed from the occupant side.

Thereafter, as illustrated in FIG. 12, outer peripheral edges of the main panels 11A and 11B, excluding the folding edge and the protruding portions 11r and 11s, are sewn together by sewing threads 51 and 52. The sewing thread 51 sews together upper outer peripheral edges of the main panels 11A and 11B, and the sewing thread 52 sews together lower outer peripheral edges of the main panels 11A and 11B. Note that the sewing threads 51 and 52 do not sew together the protruding portions 11r and 11s at rear edges of the main panels 11A and 11B. Accordingly, a loading/unloading opening 33 (FIG. 12) for the inflator 2 is formed between the protruding portions 11*r* and 11*s*.

After the outer peripheral edges of the right and left main panels 11A and 11B are sewn together by the sewing threads 51 and 52, the inflator 2 is inserted to between the partition panels 7A and 7B in the side airbag 1 through the loading/unloading opening 33. The inflator 2 is provided with two stud bolts 2*a* and 2*b*. The inflator 2 is inserted to between the partition panels 7A and 7B such that the stud bolt 2*a* is passed through the small hole 12 and the stud bolt 2*b* is passed through the small hole 14. Thereafter, the side airbag 1 is folded back by 180 degrees along a folding line L so that the stud bolt 2*a* is passed through the small holes 13 and 16 and the stud bolt 2*b* is passed through the small holes 15 and 17. The folding line L extends in the up-down direction through a center portion between the small holes 12 and 13 and a center portion between the small holes 14 and 15. By folding in the vicinity of the protruding portions 11*r* and 11*s* of the side airbag 1 along the folding line L in this manner, the loading/unloading opening 33 is hermetically closed.

The side airbag 1 is fixed to the seatback frame by the stud bolts 2*a* and 2*b* protruding out from the side airbag 1 through the small holes 12 to 17.

When the vehicle provided with the airbag device having the side airbag 1 configured as described above is subjected to a side collision from a right side, the inflator 2 is operated to generate a gas. With the gas, the inflator performs inflation, and the gas flows in the up-down direction from the inflator installation chamber 5 to inflate the upper chamber 3 and the lower chamber 4. Thereafter, the gas flows into the middle chamber 6 from the upper chamber 3 and the lower chamber 4 through the openings 8*a* and 9*a*, and inflates the middle chamber 6. A part of the gas in the inflator installation chamber 5 flows into the middle chamber 6 through the opening 7*a*.

In the side airbag 1, the upper chamber 3 and the lower chamber 4 are inflated and deployed under a high internal pressure at an early stage, and restrain the shoulder part and the waist part of the occupant at an early stage. The middle chamber 6 is inflated and deployed later than the upper chamber 3 and the lower chamber 4, and an internal pressure of the middle chamber 6 is lower than that of the upper chamber 3 and the lower chamber 4 in an inflation completion state.

In the side airbag 1, as illustrated in FIG. 13, an entire periphery of an upper edge portion of the partition panel 7 is sewn to the partition panel 8 (the right partition panel 8A and the left partition panel 8B) by the sewing threads 23 and 25, and the sewing thread 31 reaches the partition panel 7. Further, as illustrated in FIG. 15, an entire periphery of a lower edge portion of the partition panel 7 is sewn to the partition panel 9 (the right partition panel 9A and the left partition panel 9B) by the sewing threads 24 and 26, and the sewing thread 41 reaches the partition panel 7. There is no chamber existing between the inflator installation chamber 5 and the middle chamber 6. Therefore, the gas flowing from the inflator installation chamber 5 into the upper chamber 3 and the lower chamber 4 flows into the middle chamber 6 only through the openings 8*a* and 9*a*. As a result, the upper chamber 3 and the lower chamber 4 are rapidly inflated and deployed.

In this embodiment, the partition panel 8 extends obliquely upward toward the front side, the partition panel 9 extends obliquely downward toward the front side, and a distance between the partition panels 8 and 9 increases toward the front side of the side airbag 1. Accordingly, the upper chamber 3 is inflated and deployed obliquely upward from a rear end side toward the front, and the lower chamber 4 is inflated and deployed obliquely downward from a rear end side toward the front. Accordingly, the inflation and deployment of the chambers 3 and 4 are accelerated.

In this embodiment, since the widths of the right and left partition panels 8A and 8B decrease toward respective rear portion sides, a width of the partition panel 8 also decreases toward a rear portion side thereof. Therefore, over a region along the partition panel 8, an inflation thickness of the side airbag 1 decreases toward the rear portion side in an inflation completion state of the side airbag 1.

The above-described embodiment is just one embodiment of the present invention, and the present invention is not limited to the above-described embodiment.

Although the present invention has been described in detail using a specific embodiment, it will be apparent to those skilled in the art that various changes can be made without departing from the spirit and the scope of the present invention.

The invention claimed is:

1. A side airbag that is to be inflated and deployed to a side of an occupant, the side airbag comprising:
    an upper chamber provided at an upper portion;
    a lower chamber provided at a lower portion;
    a middle chamber between the upper chamber and the lower chamber;
    a first partition panel that partitions the upper chamber from the middle chamber;
    a second partition panel that partitions the lower chamber from the middle chamber;
    a third partition panel that partitions the middle chamber from an inflator installation chamber;
    a first opening that is provided in the first partition panel and through which the upper chamber and the middle chamber communicate with each other; and
    a second opening that is provided in the second partition panel and through which the lower chamber and the middle chamber communicate with each other,
    wherein the first partition panel is joined to the third partition panel,
    wherein the second partition panel is joined to the third partition panel,
    wherein the first partition panel extends from a front edge to a rear edge of the side airbag, and
    wherein a rear portion of the first partition panel is sewn to an upper edge of the third partition panel.

2. The side airbag according to claim 1,
    wherein the first partition panel extends upward toward a front side.

3. The side airbag according to claim 1,
    wherein the second partition panel extends downward toward a front side.

4. The side airbag according to claim 1,
    wherein the second partition panel extends from a front edge to a rear edge of the side airbag, and
    wherein a rear portion of the second partition panel is sewn to a lower edge of the third partition panel.

5. The side airbag according to claim 1, comprising:
    the inflator installation chamber that is positioned on a rear side in the middle chamber and communicates with the upper chamber and the lower chamber, respectively.

6. The side airbag according to claim 1,
    wherein an outer surface of the side airbag is constituted by a main panel, and wherein the main panel comprises a right main panel positioned on a right side surface of the side airbag and a left main panel positioned on a left side surface of the side airbag.

7. The side airbag according to claim 6,
wherein a protruding portion protruding rearward is provided at a middle portion of rear edges of the right main panel and the left main panel in an up-down direction,
wherein a portion between the protruding portion of the right main panel and the protruding portion of the left main panel serves as a loading/unloading opening for an inflator, and
wherein the protruding portions or a vicinity of the protruding portions is folded back to a front side to close the loading/unloading opening.

8. The side airbag according to claim 7,
wherein the right main panel and the left main panel are formed of a single continuous main panel in which the right main panel and the left main panel are connected to each other at front portions thereof,
wherein the main panel is folded back along a center line between the right main panel and the left main panel, and
wherein the right main panel and the left main panel are sewn together at an outer peripheral edge of the main panel between the folding line and the loading/unloading opening.

9. The side airbag according to claim 6,
wherein the first partition panel comprises a right first partition panel extending along a right side surface of the side airbag and a left first partition panel extending along a left side surface of the side airbag,
wherein a lower edge of the right first partition panel is sewn to the right main panel, and
wherein a lower edge of the left first partition panel is sewn to the left main panel.

10. The side airbag according to claim 9,
wherein an upper edge of a rear portion of the right first partition panel is sewn to a right portion of an upper edge of the third partition panel,
wherein an upper edge of a rear portion of the left first partition panel is sewn to a left portion of an upper edge of the third partition panel, and
wherein a front portion of an upper edge of the right first partition panel and a front portion of an upper edge of the left first partition panel are sewn together.

11. The side airbag according to claim 10,
wherein the right first partition panel and the left first partition panel are formed of a single panel in which the right first partition panel and the left first partition panel are connected to each other at front portions thereof.

12. The side airbag according to claim 6,
wherein the second partition panel comprises a right second partition panel extending along the right side surface of the side airbag and a left second partition panel extending along the left side surface of the side airbag,
wherein an upper edge of the right second partition panel is sewn to the right main panel, and
wherein an upper edge of the left second partition panel is sewn to the left main panel.

13. The side airbag according to claim 12,
wherein a lower edge of a rear portion of the right second partition panel is sewn to a right portion of a lower edge of the third partition panel,
wherein a lower edge of a rear portion of the left second partition panel is sewn to a left portion of a lower edge of the third partition panel, and
wherein a front portion of a lower edge of the right second partition panel and a front portion of a lower edge of the left second partition panel are sewn together.

14. The side airbag according to claim 13,
wherein the right second partition panel and the left second partition panel are formed of a single panel in which the right second partition panel and the left second partition panel are connected to each other at front portions thereof.

15. The side airbag according to claim 1,
wherein the third partition panel comprises a right third partition panel and a left third partition panel,
wherein a front edge of the right third partition panel and a front edge of the left third partition panel are sewn together,
wherein an upper edge of the right third partition panel and an upper edge of the left third partition panel are not sewn together, whereby the inflator installation chamber is open toward the upper chamber, and
wherein a lower edge of the right third partition panel and a lower edge of the left third partition panel are not sewn together, whereby the inflator installation chamber is open toward the lower chamber.

16. The side airbag according to claim 1,
wherein the third partition panel is provided with an opening through which the inflator installation chamber and the middle chamber communicate with each other.

17. The side airbag according to claim 1,
wherein a vent hole is provided in a front portion of the middle chamber.

18. An airbag device comprising:
the airbag according to claim 1; and
an inflator that inflates the airbag.

* * * * *